United States Patent [19]

Venema

[11] 4,053,398
[45] Oct. 11, 1977

[54] METHOD AND APPARATUS FOR WATER REMOVAL FROM OIL IN SUBMERSIBLE MOTOR ENVIRONMENT

[75] Inventor: Harry J. Venema, Wheaton, Ill.

[73] Assignee: Borg-Warner Corporation, Chicago, Ill.

[21] Appl. No.: 662,191

[22] Filed: Feb. 26, 1976

[51] Int. Cl.² ............................................. B01D 15/00
[52] U.S. Cl. ............................ 210/41; 417/313; 210/416 R
[58] Field of Search ............... 210/41, DIG. 6, 416 F, 210/416 R; 310/87; 123/119 B, 196; 417/313

[56] References Cited

U.S. PATENT DOCUMENTS

| | | | |
|---|---|---|---|
| 1,235,898 | 8/1917 | Jay | 123/119 |
| 1,316,547 | 9/1919 | Waldon | 184/6.24 |
| 1,344,982 | 6/1920 | Brown | 123/196 |
| 1,570,626 | 1/1926 | Elsenbast | 210/41 |
| 1,866,659 | 7/1932 | Litle, Jr. | 210/41 |
| 2,067,345 | 1/1937 | Roberts | 204/24 |
| 2,233,093 | 2/1941 | Carman et al. | 210/41 |
| 2,295,097 | 9/1942 | Waugh | 123/196 |
| 2,376,418 | 5/1945 | Clark et al. | 252/358 |
| 2,451,124 | 10/1948 | Smith | 308/77 |
| 2,770,317 | 11/1956 | Bottum | 55/387 |

Primary Examiner—Frank A. Spear, Jr.
Assistant Examiner—E. Rollins Cross
Attorney, Agent, or Firm—Aubrey L. Burgess

[57] ABSTRACT

A water-absorbing material, such as silica gel, activated alumina and the like, is dispersed in the oil in which a submersible motor is operated, so as to absorb water which leaks into the motor housing. The water-absorbing material is then heated to a temperature at which the water is released. The water will flow, because of its specific gravity to a collection zone for removal to a location removed from the motor.

6 Claims, 1 Drawing Figure

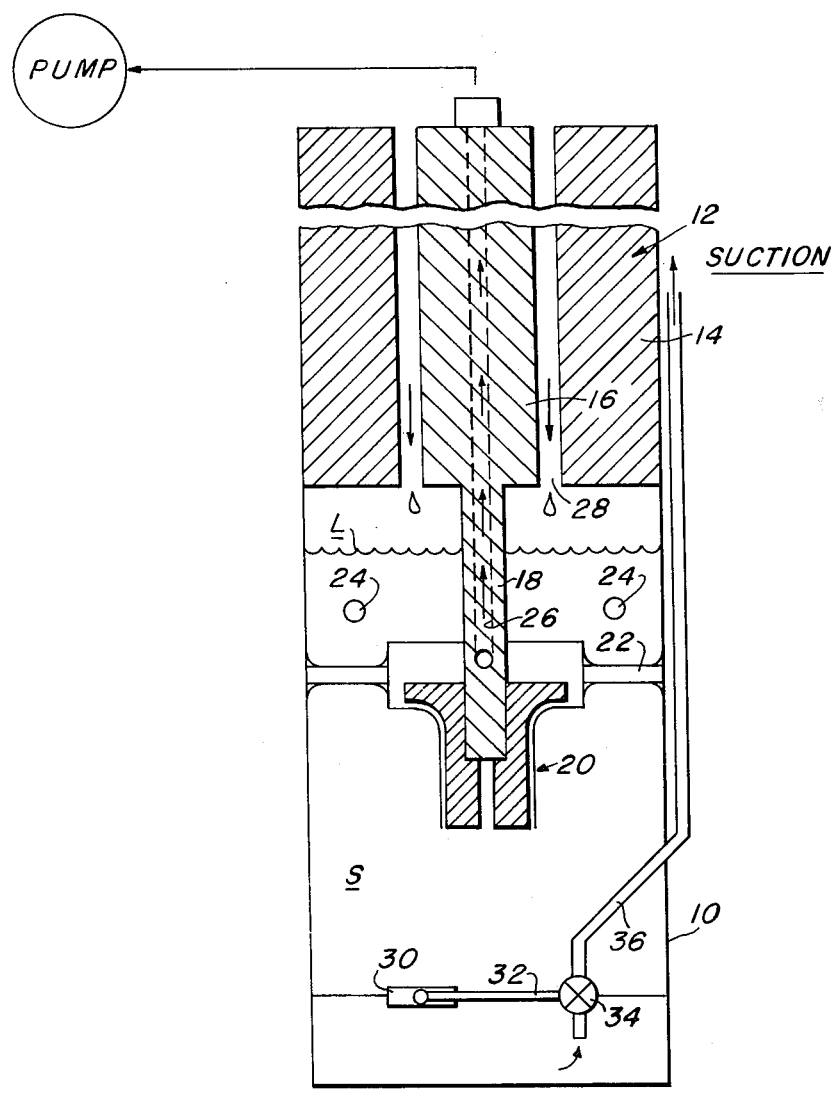

METHOD AND APPARATUS FOR WATER REMOVAL FROM OIL IN SUBMERSIBLE MOTOR ENVIRONMENT

BACKGROUND OF THE INVENTION

The concept of purifying oils to be used for electrical insulating purposes, such as dielectric oils used in transformers, circuit breakers, and the like by removing water therefrom, which water is absorbed by water absorption, is well known in the art. For example, Roberts et al, in their U.S. Pat. No. 2,067,345 teaches placing in the oil a finely divided absorbent material, such as activated carbon, silica, and the like. The water containing oil may be subjected to a filtration step to remove the water therein. After water removal, the oil is used for its intended purposes.

The U.S. Pat. No. 2,233,093, issued to Carman et al discloses an oil filter for use with an internal combustion engine. It comprises an oil filter cartridge having a homogeneous filter bed of discrete particles in combination with a fibrous mat to direct the oil to be filtered and distribute it uniformly into the filter bed. Moisture may be released from the filter bed when the oil becomes heated because the engine has operated for sometime.

THE INVENTION

The invention to be descibed herein relates to a method and apparatus for removing contaminant, namely water, that is contained in the oil circulating in a submersible motor. The water leaks into the motor housing and into the oil therein although every effort is made to seal the housing and motor, so that the oil does not become contaminated by the water. Water in the motor changes the dielectric breakdown potential of the insulating material of the motor causes electrical arcing which can lead to motor burn-out or other breakdowns of the motor.

A finely divided water-absorbing particulate material, such as silica gel, activated alumina and the like, is dispersed throughout the oil, so as to absorb water therein. The oil-particulate-water mix is heated, at a location removed from the motor but in the housing to a temperature at which the water is free from the silica gel. The free water is collected in a collection zone, in the housing, and then removed from the housing.

The finely divided particulate water-absorbing material is chosen to have a particle size of about 10% to 30% of the smallest clearance space in the system through which the oil-particle mixture passes as, for example, the clearance of a bearing and the like. Thus, the particulate material will not deleteriously affect the operation of the motor.

THE DRAWING

The single FIGURE of the drawing is a schematic sectional view of a submersible motor in a housing incorporating apparatus and capable of operating according to the method of this invention.

DETAILED DESCRIPTION

The single FIGURE of the drawing illustrates a typical apparatus for this invention showing the lower end of a submersible motor assembly comprising a closed-end housing 10 having a motor 12 therein, the motor having the usual stator 14 and the armature 16, and a shaft 18 which extends vertically and which forms an extension of the armature. The shaft at its upper end is connected in a conventional manner to a pump which is not shown and at its lower end to a lube pump, generally indicated at 20. The lube pump structure is supported in the housing 10 by a spider 22. Above the lube pump 20 is at least one electrical heater element 24 which is below the level L of oil in the housing which forms a sump S. The lube pump 20 pumps oil from the housing through a passageway 26 in the shaft 18 to the motor; excess oil drops through the clearance 28 between the stator and the armature back into the body of oil in the housing.

At a level below the lube pump is a float 30 connected by a float arm 32 to a valve 34 in a fluid line 36 which extends to the suction for the crude oil and the like. The level of the float 30, which is of conventional construction, determines the positions of the interface between the oil in the sump S and free water which has been released from the oil above the lube pump by the electrical heater element 24. When the level of the water raises the level of the float above that which is desired, the valve is activated and connection is established between the water and the crude suction, so that water is removed from the housing. Generally the heater element is electrical, so that conventional electrical connections (not shown) are made therewith; also, generally the motor is electrical, so that electrical connections must be made with the motor.

According to this invention, a water-absorbing, fine particulate material is admixed with the oil for the sump so as to be substantially evenly dispersed therein.

After assembling the housing and the components therein, the housing, with the motor, the oil admixed with the finely divided water-absorbing material therein, and also the lube pump are lowered down an oil well casing. While it would be desirable to hermetically seal the motor from any fluid which seeps into the housing, it has not been possible to so do, so that some water seeps into the housing. Water, which is especially undesirable for the motor, is absorbed by the finely divided material. When the oil-water-particulate mixture is heated in the sump, the water separates out as free water, and because it is more dense than the oil, falls to the bottom of the housing where it collects until removed. When at a level to actuate the float and its attached valve, the free water is drawn from the housing.

The particulate material may be silica gel, activated alumina, and the like. The particle size is chosen so as to have a particulate size when diameter is from about 10% to about 30% of any clearance in the motor, such for example bearing clearance and the like. By so choosing the particulate size, injury to the motor by excessive sized particles is avoided.

I claim:

1. A method for removing water which leaks into the housing of a submersible electric motor and into the lubricating oil in said housing in which said motor operates, said lubricating oil having a water-absorbing material dispersed therein which absorbs water in said oil, the steps comprising:

heating said oil and said water-absorbing material at a location in said housing removed from said motor to a temperature sufficient to free absorbed water from said water-absorbing material to this produce free water which because of its density flows to a collection zone in said housing adjacent to the heating location; and thereafter removing the collected free water from said collection zone to a zone outside said housing.

2. A method as in claim 1 in which said water-absorbing material is a finely divided particulate material of such particle size than when dispersed in said oil permits proper operation of said motor.

3. A method as recited in claim 2 in which said water-absorbing material is silica gel.

4. A method as recited in claim 2 in which said water-absorbing material is activated alumina.

5. A method as recited in claim 1 in which said water-absorbing material has a particle size whose diameter is from about 10% to about 30% of any mechanical clearance in said motor.

6. In a submersible electric motor assembly having a housing with a lubricating oil sump into which water leaks, said oil having a water-absorbing material dispersed therethrough, the improvement which comprises:

heater means in said sump to heat the oil and its contents to a temperature sufficient to drive free water from said water-absorbing material;

means comprising a zone in said housing for collecting said free water which flows thereto because of its density; and means for removing said collected free water from said collecting zones and to a zone removed from said housing.

* * * * *